No. 639,871. Patented Dec. 26, 1899.
F. H. SNYDER & N. C. HANSEN.
RAISIN SEEDING MACHINE.
(Application filed Aug. 27, 1898.)
(No Model.) 2 Sheets—Sheet 1.
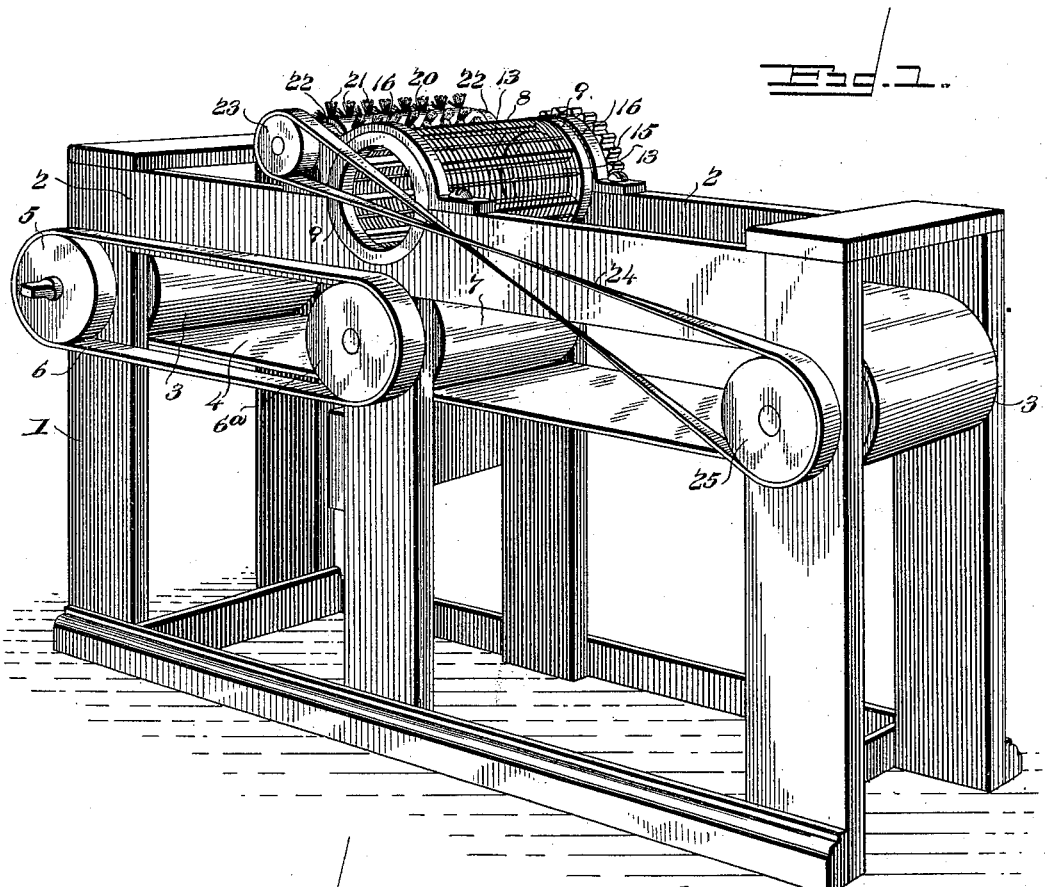
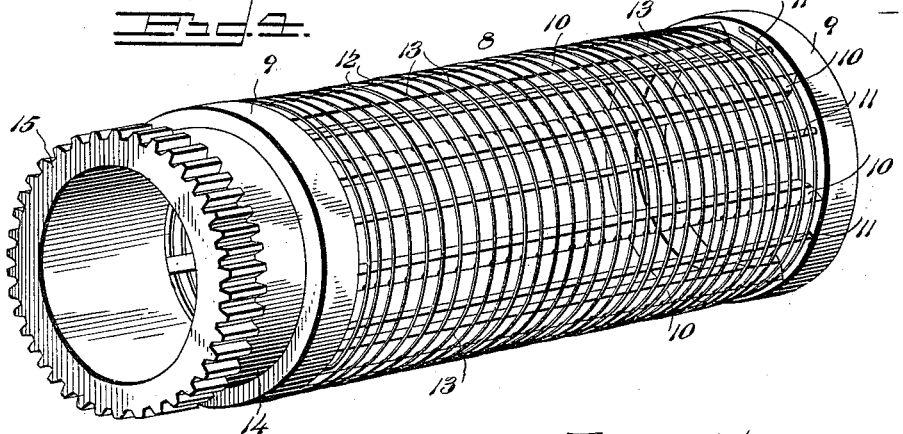

No. 639,871. Patented Dec. 26, 1899.
F. H. SNYDER & N. C. HANSEN.
RAISIN SEEDING MACHINE.
(Application filed Aug. 27, 1898.)
(No Model.) 2 Sheets—Sheet 2.
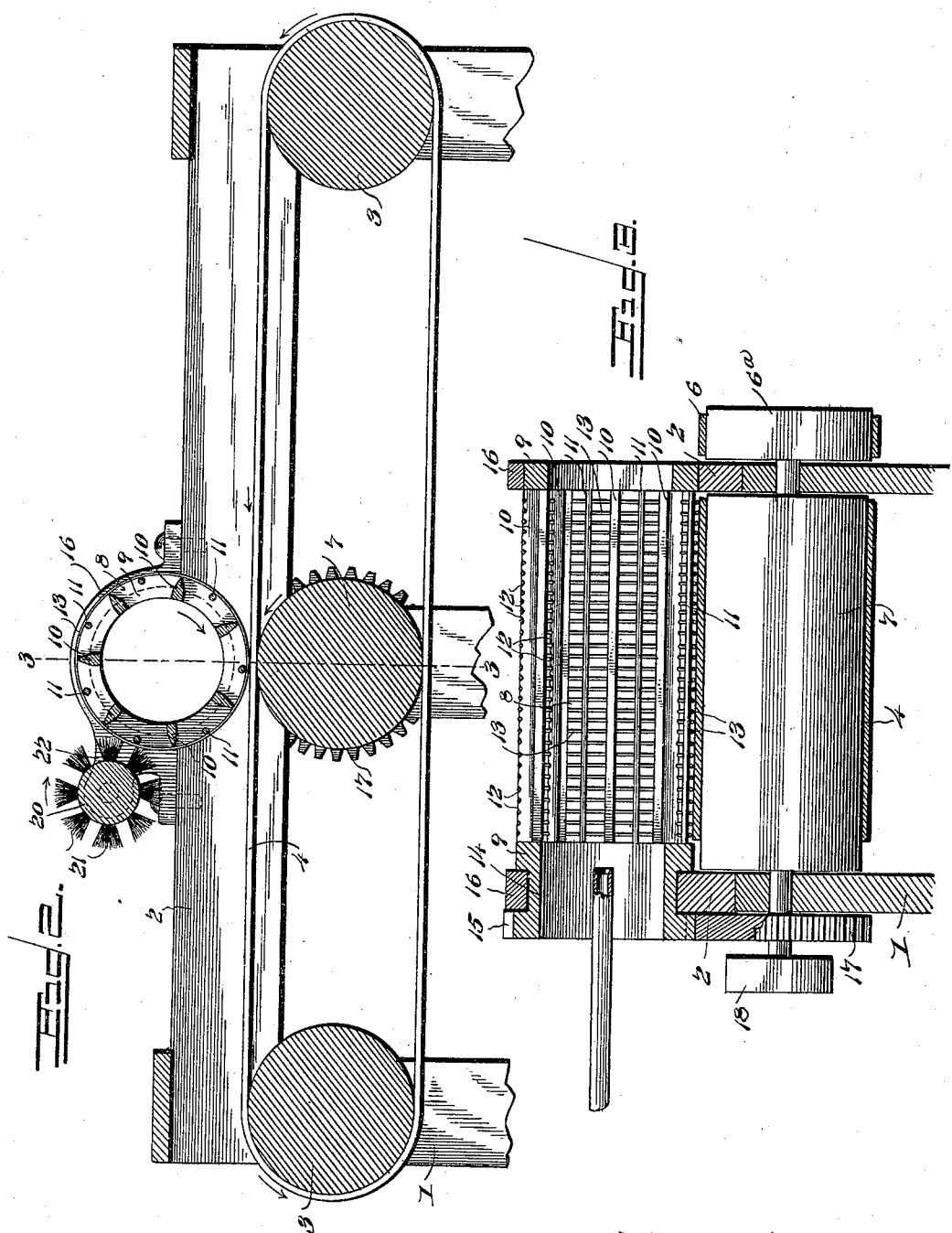
Witnesses
Frank H. Snyder
Nis C. Hansen Inventors
By their Attorneys.

UNITED STATES PATENT OFFICE.

FRANK H. SNYDER AND NIS C. HANSEN, OF FRESNO, CALIFORNIA.

RAISIN-SEEDING MACHINE.

SPECIFICATION forming part of Letters Patent No. 639,871, dated December 26, 1899.

Application filed August 27, 1898. Serial No. 689,714. (No model.)

*To all whom it may concern:*

Be it known that we, FRANK H. SNYDER and NIS C. HANSEN, citizens of the United States, residing at Fresno, in the county of Fresno and State of California, have invented a new and useful Raisin-Seeding Machine, of which the following is a specification.

This invention relates to raisin-seeding machines; and it has for its object to provide new and useful means for thoroughly seeding raisins in bulk without injury thereto.

To this end the main and primary object of the invention is to provide an improved seeding device which insures an easy passage of the raisins through the machine, while at the same time positively providing for extracting all of the seeds therefrom.

With this object in view the invention consists in the novel construction, combination, and arrangement of parts hereinafter more fully described, illustrated, and claimed.

While the invention is necessarily susceptible to modification, the essential features thereof are preferably embodied in the arrangement shown in the accompanying drawings, in which—

Figure 1 is a perspective view of a raisin-seeding machine embodying the improvements contemplated by this invention. Fig. 2 is a vertical longitudinal sectional view thereof. Fig. 3 is a vertical transverse sectional view on the line 3 3 of Fig. 2. Fig. 4 is an enlarged detail perspective view of the hollow seeding-drum removed from the machine.

Referring to the accompanying drawings, the numeral 1 designates an upright supporting frame or stand having the horizontal longitudinal side pieces 2 at the top thereof, and within the top portion of the frame or stand 1, at opposite ends thereof, are respectively mounted the oppositely-located belt-rollers 3, which are preferably arranged in the same horizontal plane and have arranged for movement thereon an endless carrier-belt 4, running horizontally and longitudinally within the supporting frame or stand. The endless carrier-belt 4 is preferably made of rubber fabric and is of a width equaling the length of the rollers 3, supporting the same, so that a large quantity of raisins can be carried through the machine continuously. Motion is communicated to the endless carrier-belt 4 from one of the belt-rollers 3, which has mounted on one of its spindle extremities a pulley 5, over which passes an endless drive-belt 6, driven from a pulley 6ª, mounted on one of the spindle extremities of the intermediate bed-roller 7.

The intermediate bed-roller 7 has its spindle extremities journaled in suitable bearings on the frame or stand 1, and said bed-roller is arranged intermediate of the belt-rollers 3, between the upper and lower portions of the endless carrier-belt, and immediately below and in the same vertical plane as the revoluble seeding-drum 8. The revoluble seeding-drum 8 works in contact with the upper portion of the endless carrier-belt directly above the bed-roller 7, and there is only sufficient space between this roller and the seeding-drum to permit the passage of the rubber carrier-belt 4, thereby insuring a firm pressure of the raisins against the seeding-drum as they pass beneath the same.

The revoluble seeding-drum 8 essentially comprises oppositely-located ring-heads 9, which are connected by a plurality of regularly-spaced longitudinal supporting-bars 10, which, together with the heads 9, form the hollow skeleton body of the drum. In addition to the bars 10 the body of the drum may be braced by suitable brace-rods 11, connecting the ring-heads 9 between the bars 10, thereby greatly strengthening the drum, and the said bars 10 are preferably of an outwardly-tapering form or of an inverted-V shape, so as to present no obstruction to the passage of the seed into the drum, and at their outer sharp edges or apices the bars 10 are provided with a longitudinal series of spacing-notches 12, which receive the separate convolutions of the convoluted spring-wire covering 13 for the drum.

The spring-wire covering 13 for the seeding-drum is preferably made of a single length of spring-steel wire, which is first coiled around a cylinder of the same size as the skeleton body of the drum and is then recoiled on the latter, with its separate convolutions regularly spaced apart and resting in the spacing-notches 12 of the supporting-bars 10, said spacing-notches holding the convolutions of the wire covering firmly in place and preventing the same from spreading or springing out of position when the seeds of the raisin are forced therebetween. To secure the wire covering in place, one end or terminal of the spring-wire is preferably fastened to one of the ring-heads 9, while the other end or terminal is fastened to the other ring-head.

At one end the spring seeding-drum 8 has projected therefrom a journal-collar 14, carrying a gear-wheel 15, and at its opposite end portions the drum is journaled in suitable bearing boxes or straps 16, arranged on top of the frame or stand 1 at diametrically opposite sides thereof, so as to position the drum for rotation transversely of the frame or stand and directly above the bed-roller 7. The gear-wheel 15 at one end of the seeding-drum meshes with a similar gear-wheel 17, fitted on one of the spindle extremities of the bed-roller 7, and at one side of the gear-wheel 17 is preferably arranged the drive-pulley 18 for receiving the main driving-belt which communicates motion to the working parts of the machine.

The interior of the hollow seeding-drum is continually cleaned and freed of the seeds by means of a steam-jet delivered into one end of the same through a suitable jet-nozzle 30, while the seeded raisins, or pulp, which cling to the spring-wire covering of the drum are removed therefrom and thrown back onto the carrier-belt through the medium of a doffer-brush 20. The doffer-brush 20 is arranged at one side of the seeding-drum 8 in close proximity thereto and extends the full length thereof, with its brush-bristles 21 working in direct contact with the spring-wire covering 13. The spindle extremities of the doffer-brush 21 are journaled in suitable bearings 22, arranged at opposite top sides of the frame or stand 1, and one of the spindle extremities of said brush has fitted thereon a pulley 23, receiving a belt 24, which is driven from a belt pulley or wheel 25 on one of the spindle or shaft extremities of one of the belt-rollers 3.

In preparing raisins for the market, the clusters are first passed through a stemmer which removes the stems, after which the same are introduced into a suitable feeding device or distributer for delivering the same to the seeding mechanism; but since different types of stemmers and feeding devices could be used in connection with the present invention, and no claim is made thereto herein, the same are not illustrated in the drawings; but it will be understood that in the operation of the machine the stemmed raisins are distributed from the feeding device onto the upper portion of the endless carrier-belt in a continuous and even layer, so that as the carrier-belt advances the raisins are carried between the seeding-drum and the bed-roller 7. The said seeding-drum and bed-roller rotate at the same peripheral rate of speed, but in opposite directions, and as the raisins are carried therebetween the unyielding bed-roller 7 will cause the raisins to press firmly against the spring-wire covering 13 of the seeding-drum, and as the convolutions of this covering are too close together to permit the raisins to pass into the drum the seeds will necessarily be squeezed or forced out of the pulp of the raisins between the convolutions of the spring-wire covering and into the interior of the drum. The seeds thus extracted from the raisins are blown or forced out of one end of the drum by the steam-jet from a nozzle, whereby the drum will be kept constantly clean. The resiliency of the spring-wire covering 13 prevents injury to the pulp or body of the raisins, while at the same time permitting the seeds to be forced therethrough into the drum, as will be readily understood, and the seeded-raisins which adhere to the exterior of the wire-spring covering 13 are doffed therefrom by the brush 20 and thrown back onto the endless carrier-belt, which carries the same to one end of the machine, where they drop into the bin, box, or other suitable receiving-receptacle.

From the foregoing it is thought that the construction, operation, and advantages of the herein-described machine will be readily apparent to those skilled in the art without further description, and it will be understood that changes in the form, proportion, and the minor details of construction may be resorted to without departing from the principle or sacrificing any of the advantages of this invention.

Having thus described the invention, what is claimed, and desired to be secured by Letters Patent, is—

1. In a raisin-seeding machine, the combination with a suitable bed, of a revoluble seeding-drum comprising a hollow skeleton body having oppositely-arranged heads, a plurality of spaced longitudinal supporting-bars of an outwardly-tapering form, and a convolute spring-wire covering whose separate convolutions engage with the sharp edges or apices of said bars, substantially as set forth.

2. In a raisin-seeding machine, the frame or stand, a suitable bed, a revoluble hollow seeding-drum working in proximal relation to said bed, and open at both ends, a steam-jet nozzle arranged to deliver a jet of steam longitudinally of the drum through one of its open ends, a rotary doffing-brush arranged exteriorly of the drum, and means for directing the fruit between the bed and the drum, substantially as set forth.

In testimony that we claim the foregoing as our own we have hereto affixed our signatures in the presence of two witnesses.

FRANK H. SNYDER.
NIS C. HANSEN.

Witnesses:
W. T. SHELTON,
J. M. BEASLEY.